(12) United States Patent
Kim et al.

(10) Patent No.: US 9,191,678 B2
(45) Date of Patent: Nov. 17, 2015

(54) APPARATUS AND METHOD OF RESTORING IMAGE

(75) Inventors: Doo-hyun Kim, Yongin-si (KR);
Hyun-Sang Park, Yongin-si (KR);
Si-hwa Lee, Yongin-si (KR); Do-hyung Kim, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 1214 days.

(21) Appl. No.: 11/778,260

(22) Filed: Jul. 16, 2007

(65) Prior Publication Data
US 2008/0019450 A1 Jan. 24, 2008

(30) Foreign Application Priority Data
Jul. 19, 2006 (KR) ........................ 10-2006-0067633

(51) Int. Cl.
| | |
|---|---|
| *H04N 7/12* | (2006.01) |
| *H04N 19/40* | (2014.01) |
| *H04N 19/61* | (2014.01) |
| *H04N 19/86* | (2014.01) |
| *H04N 19/895* | (2014.01) |
| *H04N 19/577* | (2014.01) |

(52) U.S. Cl.
CPC ............ *H04N 19/40* (2014.11); *H04N 19/577* (2014.11); *H04N 19/61* (2014.11); *H04N 19/86* (2014.11); *H04N 19/895* (2014.11)

(58) Field of Classification Search
CPC ...................................................... H04N 7/50
See application file for complete search history.

(56) References Cited

U.S. PATENT DOCUMENTS

| | | | |
|---|---|---|---|
| 5,293,616 A * | 3/1994 | Flint .................................... 1/1 |
| 5,883,823 A * | 3/1999 | Ding ............................. 708/402 |
| 6,476,816 B1 | 11/2002 | Deming et al. |
| 6,823,016 B1 * | 11/2004 | Nguyen et al. ........... 375/240.25 |
| 2001/0040926 A1 * | 11/2001 | Hannuksela et al. ..... 375/240.27 |
| 2002/0111977 A1 * | 8/2002 | Keay ............................. 708/400 |
| 2003/0081850 A1 * | 5/2003 | Karczewicz et al. ......... 382/247 |
| 2003/0156646 A1 * | 8/2003 | Hsu et al. ................. 375/240.16 |
| 2003/0194010 A1 * | 10/2003 | Mukerjee et al. ........ 375/240.16 |
| 2004/0015931 A1 * | 1/2004 | Larin et al. .................... 717/158 |

(Continued)

FOREIGN PATENT DOCUMENTS

| | | |
|---|---|---|
| JP | 2005-070938 | 3/2005 |
| JP | 2005-070938 A | 3/2005 |
| KR | 10-2001-0006855 | 1/2001 |
| KR | 10-2001-0031193 | 4/2001 |
| KR | 10-2004-0037190 | 5/2004 |
| WO | 2005083684 | 9/2005 |
| WO | WO 2005/083684 A1 * | 9/2005 |

OTHER PUBLICATIONS

Jorn Sotermann et al., "Video coding with H.264/AVC: Tools, Performance, and Complexity", IEEE circuits and systems magazine, first quarter, 2004, pp. 7-28.*

(Continued)

*Primary Examiner* — Luu Pham
*Assistant Examiner* — Canh Le
(74) *Attorney, Agent, or Firm* — Harness, Dickey & Pierce, P.L.C.

(57) ABSTRACT

Restoring an image is achieved by restoring a block by executing at least one first restoring function and at least one second restoring function. The first restoring function may be implemented using software, and the second restoring function may be implemented using hardware. By assigning restoring functions to be either first restoring functions or second restoring functions, even an image having high resolution can be restored and reproduced in real-time.

6 Claims, 5 Drawing Sheets

(56) References Cited

U.S. PATENT DOCUMENTS

| | | | |
|---|---|---|---|
| 2004/0213468 A1* | 10/2004 | Lee et al. | 382/236 |
| 2005/0053157 A1* | 3/2005 | Lillevold | 375/240.25 |
| 2005/0120161 A1* | 6/2005 | Barth et al. | 711/100 |
| 2005/0149690 A1* | 7/2005 | Kang | 712/1 |
| 2005/0228612 A1* | 10/2005 | Oh | 702/132 |
| 2005/0228969 A1* | 10/2005 | Audrain et al. | 712/24 |
| 2006/0062057 A1* | 3/2006 | Blasi et al. | 365/193 |
| 2006/0133483 A1* | 6/2006 | Park et al. | 375/240.08 |
| 2006/0187226 A1* | 8/2006 | Bruno et al. | 345/534 |
| 2006/0209966 A1* | 9/2006 | Walker | 375/240.25 |
| 2007/0011421 A1* | 1/2007 | Keller et al. | 711/165 |
| 2007/0032985 A1* | 2/2007 | Nguyen et al. | 702/183 |
| 2007/0033494 A1* | 2/2007 | Wenger et al. | 714/776 |
| 2007/0064815 A1* | 3/2007 | Alvarez et al. | 375/240.29 |

OTHER PUBLICATIONS

Tung-Chien Chen, "Analysis and Architecture Design of an HDTV720p 30 Frames/s H.264/AVC Encoder", IEEE Transactions on circuits ans systems for video technology, vol. 16, No. 6, Jun. 2006, pp. 673-668.*

Korean Office Action dated Sep. 4, 2007 issued in KR Application No. 10-2006-0067633.

Jang, S. et al. "*An efficient hardware-software co-implementaion of an H.263 video codec*", pp. 771-782, The Korean Institute of Communications and Information Sciences; published Apr. 30, 2000.

* cited by examiner

APPARATUS AND METHOD OF RESTORING IMAGE

CROSS-REFERENCE TO RELATED APPLICATIONS

This application claims the benefit of priority under 35 U.S.C. §119(a) of Korean Patent Application No. 10-2006-0067633, filed on Jul. 19, 2006, in the Korean Intellectual Property Office, the disclosure of which is incorporated herein by reference in its entirety.

BACKGROUND OF THE INVENTION

1. Field of the Invention

The present general inventive concept relates to image reproduction, and more particularly, to moving image reproduction that restores a compressed moving image.

2. Description of the Related Art

Generally, more image data is required to represent a moving image than is needed to represent a static image, an audio signal, or textual data. Accordingly, moving images are generally compressed and encoded prior to being transmitted or stored.

Moving image reproduction, as generally used herein, refers to reproducing the transmitted or stored moving images. That is, moving image reproduction generally refers to restoring compressed moving images.

Moving image reproduction is typically performed in a series of processes. For example, when the moving image reproduction is performed according to the H.264 standard of ITU-T (International Telecommunication Union-Telecommunication Standardization Sector) or MPEG4-AVC (Moving Picture Experts Group, Version 4-Advanced Video Coding) of ISO/IEC (International Organization for Standardization/International Electrotechnical Commission) JTC1 (Joint Technical Committee 1), the series of processes may include entropy decoding, inverse quantization, inverse discrete cosine transformation, motion compensation, etc.

An apparatus that performs such a series of processes to recover an image using software, such as a DSP (Digital Signal Processor) or the like, has been in use for many years. However, such a general use apparatus is typically very large and consumes a significant amount of power, and is thus not commercially viable as a single purpose image restoration device.

Accordingly, an apparatus that performs the series of processes to recover an image using hardware has been introduced. However, in these types of devices, images cannot be restored in real-time due to the frequent access to a certain memory required. Such a problem is serious when the image to be restored is intended to be of high quality.

SUMMARY OF THE INVENTION

The present general inventive concept provides an apparatus to restore an image which efficiently and quickly restores a block by presetting each of a plurality of restoring functions to be executed while restoring the block using one of either software or hardware.

The present general inventive concept also provides a method of restoring an image which efficiently and quickly restores a block by presetting each of a plurality of restoring functions to be executed while restoring the block using one of either software or hardware.

The present general inventive concept also provides a computer readable recording medium having recorded thereon a computer program to execute the method which efficiently and quickly restores a block by presetting each of a plurality of restoring functions to be executed while restoring the block using one of either software or hardware.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing an apparatus to restore an image which restores a block by executing at least one first restoring function and at least one second restoring function, the apparatus including a first restoring unit which executes the first restoring function using software, and a second restoring unit which executes the second restoring function using hardware.

The foregoing and/or other aspects and utilities of the present general inventive concept are also achieved by providing a method of restoring an image which restores a block by executing at least one first restoring function and at least one second restoring function, the method including executing the first restoring function using software, and executing the second restoring function using hardware.

The foregoing and/or other aspects and utilities of the present general inventive concept are also achieved by providing a computer readable recording medium having recorded thereon a computer program to execute a method of restoring an image which restores a block by executing at least one first restoring function and at least one second restoring function, the method including executing the first restoring function using software, and executing the second restoring function using hardware.

The foregoing and/or other aspects and utilities of the present general inventive concept are also achieved by providing an apparatus to restore an image including a memory having stored therein processor instructions, a first circuit to perform at least one first restoring function on image data received thereby by retrieving and executing the processor instructions in the memory, and a second circuit excluded form access to the processor instructions to perform at least one second restoring function on the image data, where the at least one first restoring function and the at least one second restoring function are performed in combination to restore the image from the image data.

The foregoing and/or other aspects and utilities of the present general inventive concept are also achieved by providing a method of restoring an image through a plurality of restoring functions including separating the restoring functions into at least one first restoring function and at least one second restoring function in accordance with a performance measure, configuring a plurality of processor instructions that, when executed by a processor, perform the at least one first restoring function, configuring a circuit to perform the at least one second restoring function, and performing by the processor the at least one first restoring function and performing by the circuit the at least one second restoring function on encoded image data to restore the image therefrom.

BRIEF DESCRIPTION OF THE DRAWINGS

These and/or other aspects and utilities of the present general inventive concept will become more apparent by describing in detail exemplary embodiments thereof with reference to the attached drawings in which.

DETAILED DESCRIPTION OF THE PREFERRED EMBODIMENTS

Figure 1:
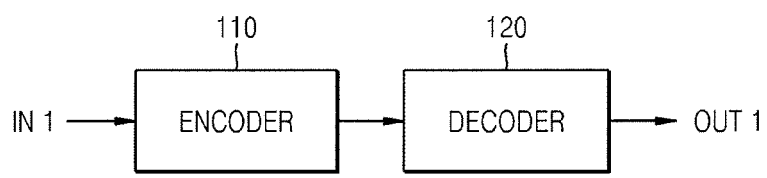
FIG. 1 is a schematic block diagram describing encoding and decoding of an image.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a schematic block diagram describing encoding and decoding of an image, including an encoder 110 and a decoder 120.

The encoder 110 generates a bitstream by encoding an image provided to an input port IN1 and transmits the bitstream to the decoder 120. Here, the image may be a moving image. That is, the image may be formed of a plurality of frames in sequential display order, and each frame may be formed of a plurality of blocks.

The decoder 120 restores the image by decoding the bitstream transmitted from the encoder 110 and outputs the image to an output port OUT1. When the encoder 110 uses a lossless compression technique while encoding the image, the restored image is equivalent to the image provided to the input port IN1. On the other hand, when the encoder 110 uses a lossy compression technique while encoding the image, the restored image is similar to, but not equivalent to, the image provided to the input port IN1.

An apparatus and concomitant method of restoring an image according to embodiments of the present general inventive concept perform each restoring function using either software or hardware at the decoder 120, based on an estimation of the performance of each restoring function, such as by determining whether the corresponding restoring function will be more quickly executed using software or hardware. Here, the restoring function is any of the processes executed in the decoder 120 to recover the images provided thereto. Also, as used herein, a software implementation of a restoring function is one executed by processing circuitry using processor instructions stored in a code segment, or an equivalent location, of a storage device, such as memory. A hardware implementation of a restoring function is one carried out on hardware designed specifically to carry out the restoring function, and thus does so without accessing such a code segment, or other instruction storage, to retrieve the instructions to execute the function.

Before describing the apparatus and method of embodiments of the present general inventive concept, the encoder 110 and the decoder 120 illustrated in FIG. 1 will be described briefly.

The encoder 110 and the decoder 120 may be realized according to the recommendation of H.261 approved in 1989 by ITU-T or the MPEG-1 (ISO/IEC 11172-1) standard approved in 1991 by MPEG1 of ISO/IEC JTC1.

Similarly, the encoder 110 and the decoder 120 may be realized according to the H.262|MPEG-2 (ISO/IEC 13818-2) standard approved in 1994 by ITU-T and ISO/IEC JTC1. In detail, the encoder 110 and the decoder 120 may be realized according to a simple profile (SP), a main profile (MP), or a high profile (HP).

On the other hand, the encoder 110 and the decoder 120 may be realized according to the recommendation of H.263 approved in 1996 by ITU-T or the MPEG-4 Part 2 (ISO/IEC 14496-2) standard by ISO/IEC JTC1.

Similarly, the encoder 110 and the decoder 120 may be realized according to the H.264|MPEG-4 AVC (ISO/IEC 14496-10) standard approved in 2003 by ITU-T and ISO/IEC JTC1. In detail, the encoder 110 and the decoder 120 may be realized according to a baseline profile (BP), a main profile (MP), or an extended profile (EP).

Figure 2:
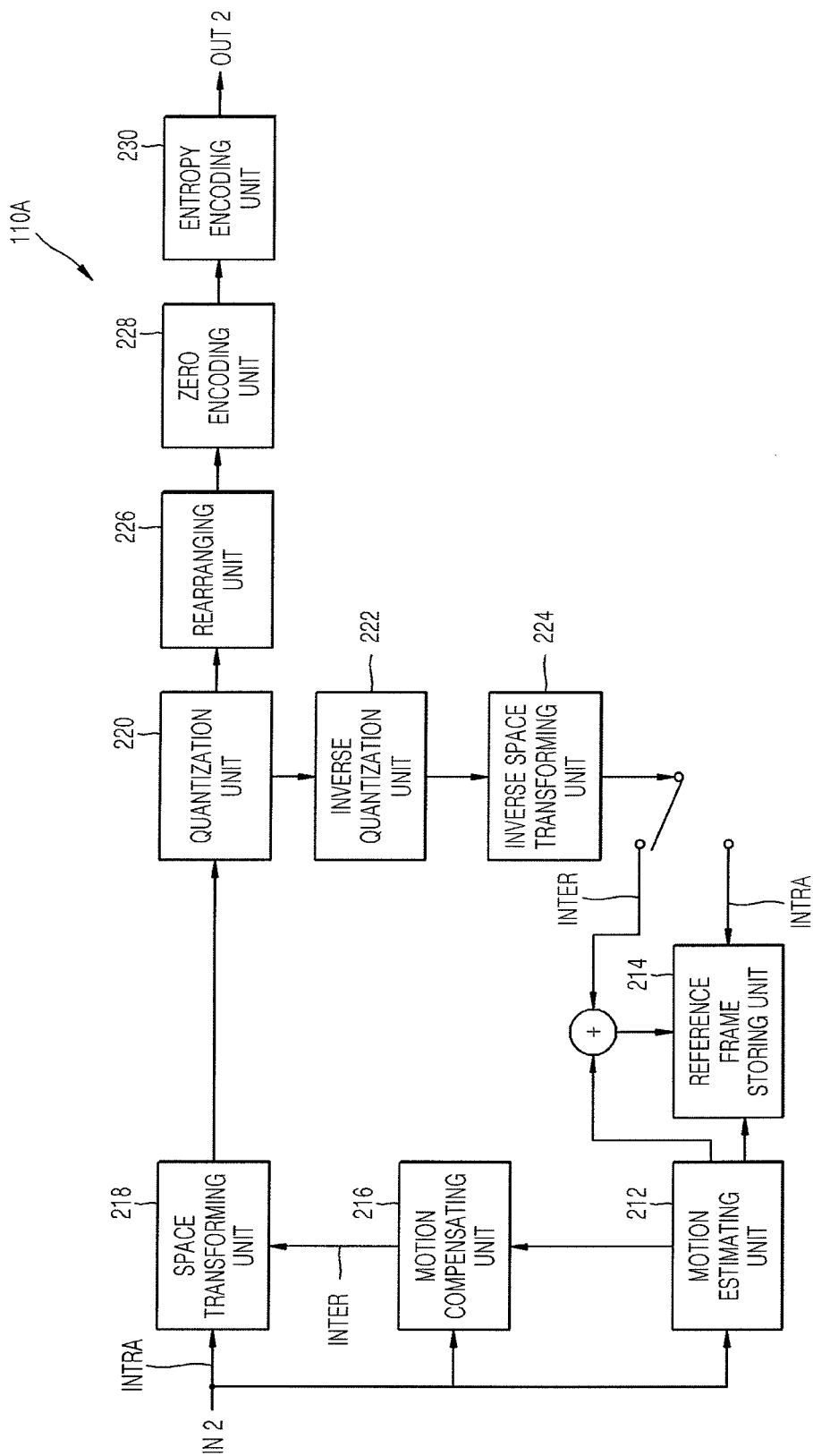
FIG. 2 is a block diagram illustrating an encoder illustrated in FIG. 1 according to an embodiment of the present general inventive concept.
Figure 3:
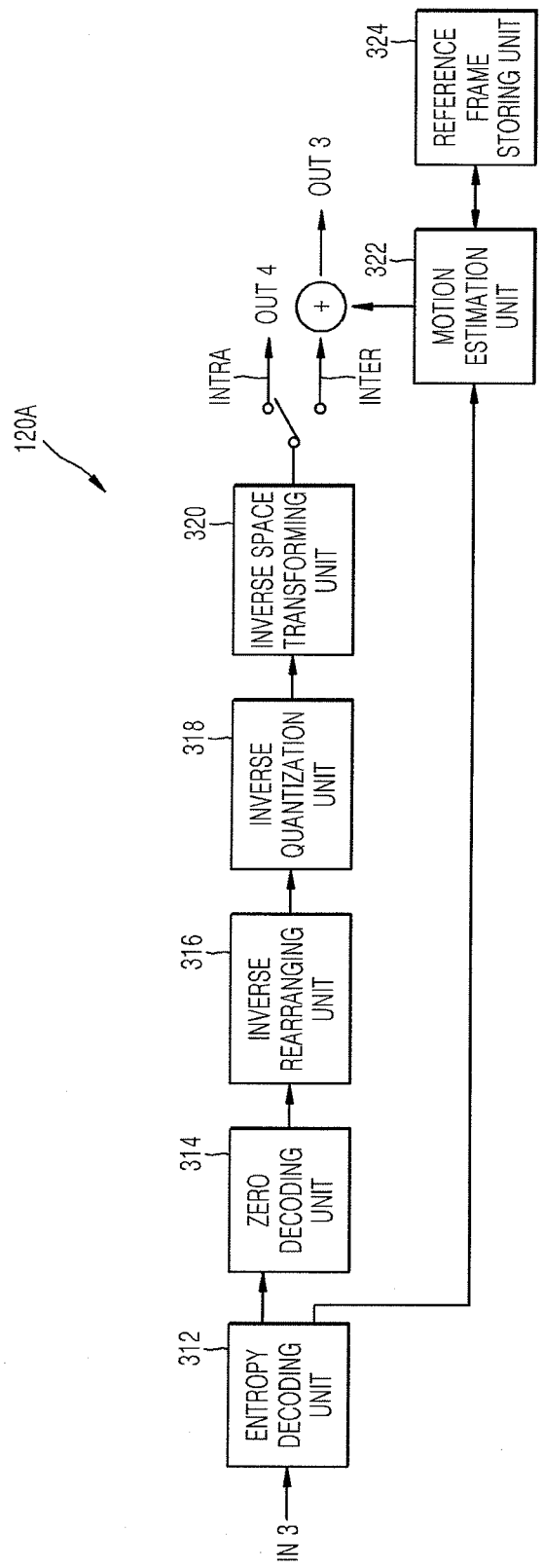
FIG. 3 is a block diagram illustrating a decoder illustrated in FIG. 1 according to an embodiment of the present general inventive concept.

FIGS. 2 and 3 are examples of the encoder 110 and the decoder 120, respectively, as illustrated in FIG. 1.

The encoder 110 and the decoder 120 respectively illustrated in FIGS. 2 and 3 may differ based on their implementations, e.g., whether the encoder 110 and the decoder 120 follow the recommendation of H.261, the MPEG-1 standard, the H.262|MPEG-2 standard, the recommendation of H. 263, the MPEG-4 Part 2 standard, or the H.264|MPEG-4 AVC standard. It is to be understood that the encoder 110 and the decoder 120 may be of an implementation outside those based on the exemplary standards listed above. The exemplary embodiments described below, however, conform to the standardized implementations for purposes of explanation and not limitation. Alternative system configurations and concomitant functionality to carry out similar features as those described below will be readily apparent by the skilled artisan upon review of this disclosure and such alternatives are intended to fall within spirit and scope of the present general inventive concept.

FIG. 2 is a block diagram illustrating an exemplary encoder 110 illustrated in FIG. 1 according to an embodiment of the present general inventive concept. The encoder 110A of FIG. 2 may include a motion estimating unit 212, a reference image storing unit 214, a motion compensating unit 216, a space transforming unit 218, a quantization unit 220, an inverse quantization unit 222, an inverse space transforming unit 224, a rearranging unit 226, a zero encoding unit 228, and an entropy encoding unit 230.

The encoder 110A may encode an image provided at an input port IN2 as an inter-coded image in an "inter mode" or as an intra-coded image in an "intra mode". The input port IN2 may serve the same function as the input port IN1 illustrated in FIG. 1.

As used herein, the inter mode refers to encoding (or decoding) an image using motion compensation, i.e., only the relative positions of sections of the image relative to a previous (or future) image are encoded, and the intra mode refers to encoding (or decoding) an image without using motion compensation, i.e. all sections of the image are encoded.

When the encoder 110 encodes the image in the inter mode, all units in the illustrated functional chain from the motion estimating unit 212 through the entropy encoding unit 230 are engaged to form the encoded image. On the other hand, when the encoder 110 encodes the image in the intra mode, the motion estimating unit 212, the motion compensating unit 216, the inverse quantization unit 222, and the inverse space transforming unit 224 are excluded from the encoding process.

Operation of the encoder 110, based on the inter mode, will now be described. For purposes of description and not limitation, the description of the operation of the encoder 110 is in the context of block-based motion compensation.

The motion estimating unit 212 searches reference frames for an m*n block that most closely matches an interest block. The interest block is an m*n block of the current image frame, wherein m and n are natural numbers and an m*n block is a block including m number of rows of pixels arranged in n number of columns. The block that matches the interest block as obtained by the above process is referred to as an estimation block.

Here, the interest block is a block which is to be currently encoded and the reference frames are one or more frames previously encoded. The reference frames are, in the illustrated embodiment, stored in the reference image storing unit 214 and the motion estimating unit 212 reads and uses the reference frames stored in the reference image storing unit 214.

The motion compensating unit 216 generates an error block by subtracting the estimation block from the interest block. Additionally, the motion compensating unit 216 generates a motion vector (MV), which is a vector of values indicative of a relative location of the interest block with respect to the estimation block.

As described above, the interest block, the estimation block, and the error block are all m*n blocks and formed of pixel values.

The space transforming unit 218 transforms the pixel values into frequency values. More specifically, the space transforming unit 218 gathers data forming the error blocks in a low frequency band.

In more detail, the space transforming unit 218 may execute a discrete cosine transform (DCT), which is described in "Discrete Cosine Transform" written by K. R. Rao and P. Yip, published in 1990 by Academic Press. In this case, the space transforming unit 218 transforms m*n pixel values of the error block into m*n DCT coefficients.

The quantization unit 220 quantizes the DCT coefficients generated in the space transforming unit 218. The quantization unit 220 may execute a linear quantization or a nonlinear quantization. In certain embodiments, the quantization unit 220 executes nonlinear quantization in order to make many of the DCT coefficients to be 0.

The inverse quantization unit 222 and the inverse space transforming unit 224 operate to produce the reference frames to encode the next interest block.

The inverse quantization unit 222 inversely quantizes the quantization result of the quantization unit 220 and the inverse space transforming unit 224 executes an inverse space transform (for example, an inverse DCT) on the inverse quantization result of the inverse quantization unit 222. Accordingly, the inverse space transforming unit 224 generates an error block.

The generated error block and the estimation block previously obtained by the motion estimating unit 212 are added together to restore the interest block, and the restored interest block is stored in the reference image storing unit 214 as a part of the reference frames.

The rearranging unit 226 rearranges the results of quantization in the quantization unit 220 while scanning the results of quantization in a zigzag pattern so that zero-valued DCT coefficients may be grouped together in strings of zeros. The zero encoding unit 228 may then execute run-level (RL) encoding. The zero encoding unit 228 can express the rearranged values in a series according to, for example, the format (run, level). Here, run is the number of 0s in front of the rearranged values which are not 0, and level is the rearranged values which are not 0.

The entropy encoding unit 230 entropy encodes the results of encoding in the zero encoding unit 228. Also, the entropy encoding unit 230 entropy encodes the motion vector generated in the motion compensating unit 216. The results of entropy encoding in the entropy encoding unit 230 are output through an output port OUT2 in a single bitstream.

Operation of the encoder 110, operating based on the intra mode, will now be described.

The space transforming unit 218 transforms pixel values of an image provided at the input port IN2 into frequency values. The space transforming unit 218 may gather data forming the image in a low frequency band and then may execute a DCT. Subsequently, the quantization unit 220 quantizes the DCT coefficients generated by the space transforming unit 218.

The rearranging unit 226 rearranges the results of quantization in the quantization unit 220 while scanning the results of quantization in a zigzag pattern so that zero-valued DCT coefficients may be grouped together in strings of zeros. The zero encoding unit 228 may then execute RL encoding.

The entropy encoding unit 230 entropy encodes the results of encoding in the zero encoding unit 228. Then the entropy encoding unit 230 outputs the results of entropy encoding to the output port OUT2 in a single bitstream.

FIG. 3 is a block diagram illustrating the decoder 120 illustrated in FIG. 1 according to an embodiment of the present general inventive concept. The decoder 120 includes an entropy decoding unit 312, a zero decoding unit 314, an inverse rearranging unit 316, an inverse quantization unit 318, an inverse space transforming unit 320, a motion estimating unit 322, and a reference image storing unit 324.

The decoder 120 may decode a bitstream provided at an input port IN3 in the inter mode or the intra mode. The bitstream at the input port IN3 may be the bitstream output through the output port OUT2 illustrated in FIG. 2.

When the decoder 120 decodes the bitstream in the inter mode, all units in the illustrated functional chain from the entropy decoding unit 312 to the reference image storing unit 324 are engaged in the decoding operation. On the other hand, when the decoder 120 decodes the bitstream in the intra mode, the motion estimation unit 322 is not involved in the decoding operation.

Operation of the exemplary decoder 120, operating in the inter mode, will now be described.

The entropy decoding unit 312 entropy decodes the bitstream input at the input port IN3. Accordingly, the entropy decoding unit 312 extracts the RL encoded block and the motion vector from the bitstream provided at the input port IN3.

The zero decoding unit 314 executes RL decoding and the inverse rearranging unit 316 recovers the quantized DCT coefficients produced at the encoder by the quantization unit 220.

The inverse quantization unit 318 inversely quantizes the quantized DCT coefficient from the inverse rearranging unit 316, and the inverse space transforming unit 320 executes an inverse space transform (for example, an inverse DCT) on the results of inverse quantization by the inverse quantization unit 318. Accordingly, the inverse space transforming unit 318 generates an error block.

The motion estimating unit 322 searches for an estimation block from among reference frames stored in the reference image storing unit 324, using the motion vector extracted from the entropy decoding unit 312.

In this case, the error block generated in the inverse space transforming unit 318 and the estimation block recovered by the motion estimating unit 322 are added together in order to restore an interest block. The restored interest block is output to an output port OUT3. Also, the restored interest block may be stored in the reference image storing unit 324 as a part of the reference frames to be used in subsequent image frames.

Operation of the exemplary decoder 120, operating in the intra mode, will now be described.

The entropy decoding unit 312 extracts the RL encoded block from the bitstream input at the input port IN3.

The zero decoding unit 314 executes RL decoding and the inverse rearranging unit 316 generates the quantized DCT coefficients.

The inverse quantization unit 318 inversely quantizes the DCT received from the inverse rearranging unit 316, and the inverse space transforming unit 320 executes an inverse space transform (for example, an inverse DCT) on the results of inverse quantization by the inverse quantization unit 318. Accordingly, the inverse space transforming unit 318 restores the image and outputs the restored image through an output port OUT4. The restored image may be stored in the reference image storing unit 324.

Figure 4A:
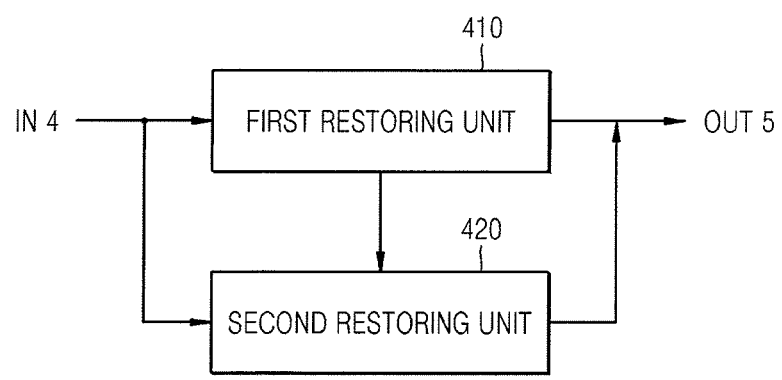
FIG. 4A is a block diagram illustrating an apparatus to restore an image according to an embodiment of the present general inventive concept.

FIG. 4A is a block diagram illustrating an apparatus to restore an image according to an embodiment of the present general inventive concept. The apparatus may include a first restoring unit 410, a second restoring unit 420, and a memory (illustrated at 430 in FIG. 4B). In FIG. 4A, an input port IN4 may serve the same purpose as the input port IN3 illustrated in FIG. 3 and an output port OUT5 may serve the same purpose as the output port OUT3 or OUT4 illustrated in FIG. 3.

In certain embodiments of the present general inventive concept, the first restoring unit 410, the second restoring unit 420, and the memory implement the decoder 120 illustrated in FIG. 1. For example, the plurality of functional components forming the decoder 120 illustrated in FIG. 1 may be realized by the first restoring unit 410, and a second plurality of the functional components may be realized by the second restoring unit 420, and the memory may realize a certain storage space to embody other components.

In certain embodiments of the present general inventive concept, the first restoring unit performs at least one restoring function through a software implementation of the restoring function, and the second restoring unit performs at least one restoring function through a hardware implementation of the restoring function. As stated above, a hardware implementation of a restoring function is one that is executed on specialized hardware that avoids retrieving instructions from a storage device, such as by being hard-wired in suitable circuitry. A software implementation of a function is executed through changeable code, and as such, may be altered as needed by a programmer. A hardware implementation requires reconfiguration of the circuitry and, although such circuitry rearrangement may be carried out through a programming language, such as through a hardware description language used to configure, say, a field-programmable array, the execution of the hardware-implemented restoring function requires no code memory access, such as is required by a processor executing a software-implemented restoring function.

Figure 4B:
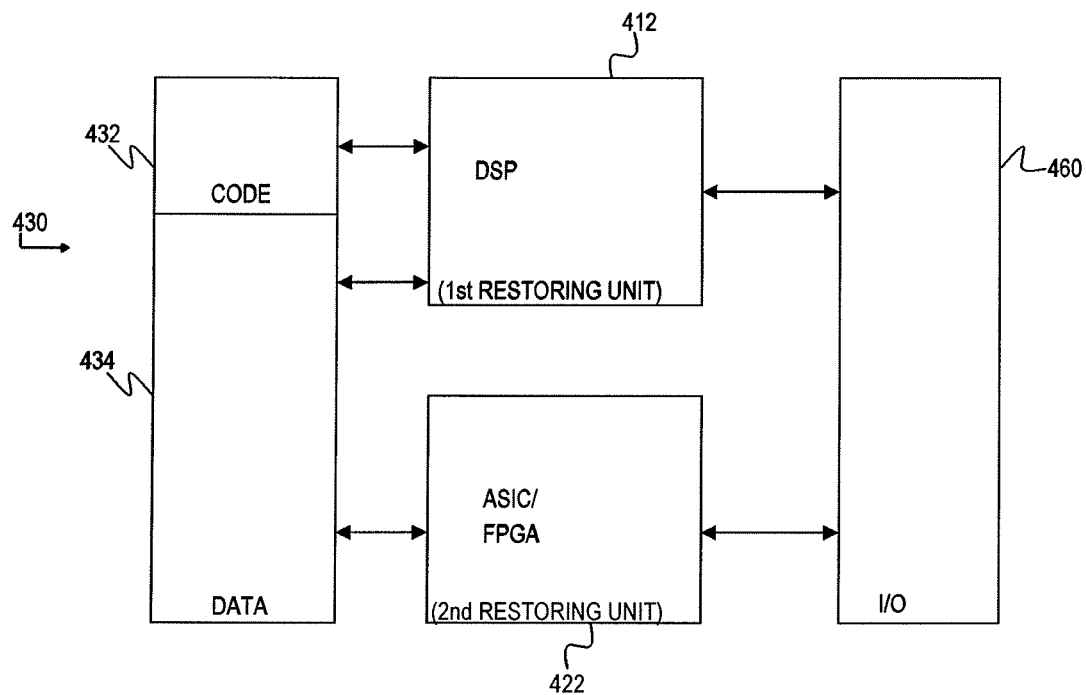
FIG. 4B is a schematic block diagram of an exemplary configuration of processing components for carrying out the exemplary embodiment of FIG. 4A.

Referring to FIG. 4B, there is illustrated an exemplary system to carry out the decoder illustrated in FIG. 4A. It is to be understood that other system configurations may be constructed to embody the present general inventive concept as intended to encompass all such alternatives and modifications. Moreover, the exemplary system illustrated in FIG. 4B is one that implements the exemplary functional compartmentalization depicted in FIG. 4A to embody a decoder in accordance with the present general inventive concept, and modifications thereto may be necessary to operate with respect to other applications. The present general inventive concept is intended to encompass these modifications as well.

As is illustrated in the exemplary embodiment of FIG. 4B, a digital signal processor (DSP) 412 executes one or more of the first restoring functions, which are implemented as instruction code sequences in a code segment 432 of memory 434. The DSP 412 and the code segment 432 implement the first restoring unit 410 of FIG. 4A. An application-specific integrated circuit (ASIC)/FPGA, or other hardware 422 realizes the second restoring unit 420 in FIG. 4A and implements one or more of the second restoring functions through, for example, a circuit configuration. It is to be observed that because the ASIC/FPGA 422 does not execute processing instructions per se, it requires no access to the code segment 432 and, as such, is excluded from such access. Both of the DSP 412 and the ASIC/FPGA 422 access the data segment 434 of the memory 430, which includes storage space for, among other things, the reference frames. However, not all restoring functions require access to the data segment 434, such as when the output of one process may be provided directly to the input of another process. As will be described more fully below, certain embodiments of the present general inventive concept exploit this type of data exchange to assign a restoring function to one of the first or second restoring functions.

It is to be understood that while the memory 430 is illustrated in FIG. 4B as a single block, the memory 430 may be distributed among several components. For example, the code segment 432 and portions of the data segment 434 illustrated in FIG. 4B may reside on board the DSP 412, other portions of the data segment 434 may be on board the ASIC/FPGA 422 and still other portions of the data segment may be commonly accessible by both the DSP 412 and the ASIC/FPGA 422. The memory 432 may be constructed from any storage mechanism including, but not limited to, solid state memory and magnetic memory, and may actually be a combination of more than one storage mechanism type.

The DSP 412 and the ASIC/FPGA 422 may be coupled to an input-output (I/O) system to implement the input and output ports, such as input port IN 4 and output port OUT 5 illustrated in FIG. 4A. The I/O system provides communication functions so that the encoded bitstream and the decoded image blocks can be communicated to and from the decoder as described above. The present general inventive concept is not limited by the communication protocol, and the I/O system may thus be any communication device suitable for implementing the input and output ports in accordance with the specific application of the present general inventive concept.

Referring to FIGS. 3, 4A and 4B, certain embodiments of the first restoring unit 410 include the functionality of the entropy decoding unit 312, the zero decoding unit 314, the inverse arranging unit 316, the inverse quantization unit 318, and the inverse space transforming unit 320. Certain embodiments of the second restoring unit 420 include the functionality of the motion estimating unit 322, and the memory 430 may include the functionality of the reference image storing unit 324. However, it is to be understood that each of the first restoring unit 410 and the second restoring unit may contain respective software and hardware implementations of any of the functional units as determined by the application criteria, such as that exemplified below.

In accordance with certain embodiments of the present general inventive concept, the first restoring function is a restoring function executed by using software and the second restoring function is a restoring function executed by using hardware. Referring to FIG. 3, the exemplary decoder 120A restores an image (more specifically, one block of the image at a time) by executing a total of six restoring functions, which are entropy decoding, zero decoding, inverse rearrangement, inverse quantization, inverse space transform, and motion estimation. As described above, the exemplary first restoring unit 410 includes the functionality of the component chain from the entropy decoding unit 312 through the inverse space transforming unit 320 illustrated in FIG. 3. The exemplary second restoring unit 420 may then include the functionality of the motion estimating unit 322 illustrated in FIG. 3. When so realized, the entropy decoding, the zero decoding, the inverse rearrangement, the inverse quantization, and the inverse space transform serve as the first restoring functions and the motion estimation serves as the second restoring function. Other assignments of functions among the first and second restoring functions are possible, and the present general inventive concept is not limited to any particular grouping.

The assignment as to which restoring functions are to be treated as the first restoring function or the second restoring function may be predetermined prior to a bitstream being input to the input port IN4. The criteria for assigning the restoring functions to the first and second restoring functions may be as follows.

When the time estimated for executing a certain restoring function using software is less than the time estimated for executing the restoring function using hardware, the restoring function may be assigned as a first restoring function.

Similarly, when the time estimated for executing a certain restoring function using software is more than the time estimated for executing the restoring function using hardware, the restoring function may be assigned as a second restoring function.

When the time estimated for executing a certain restoring function using software is the same as the time estimated for executing the restoring function using hardware, the restoring function may be assigned as either a first restoring function or a second restoring function.

The time to execute a particular restoring function impacts the decoder through a number of manifestations, such as power consumption and overall decoding latency. Thus, while time estimation is a particular choice for choosing the functional assignments indicated above, other criteria may be used to make the assignments without deviating from the intended spirit and scope of the present general inventive concept. For the time estimation case, certain embodiments of the present general inventive concept establish the criteria for the first and second restoring functions as follows.

In certain embodiments of the present general inventive concept, memory access frequency to execute a restoring function is determined. If the memory access frequency required to execute a restoring function is expected to be below a predetermined first threshold, the restoring function is assigned to be a first restoring function. When memory access frequency required to execute a restoring function is expected to exceed the predetermined first threshold, the restoring function is assigned to be a second restoring function. When memory access frequency required to execute a restoring function is expected to be the same as the predetermined first threshold, the restoring function may be assigned as either of the first or second restoring function. Referring to FIG. 3, since the motion estimation needs to use the reference frames and must therefore access memory with high frequency, the motion estimation may be a second restoring function. On the other hand, each of the entropy decoding, the zero decoding, the inverse rearrangement, the inverse quantization, and the inverse space transform accesses the memory relatively less than the motion estimation, even when access to memory to obtain instructions is considered. Accordingly, the entropy decoding, the zero decoding, the inverse rearrangement, the inverse quantization, and the inverse space transform may be first restoring functions.

Meanwhile, criteria for the first and second restoring functions may also be expressed as follows.

When the number of operations performed to execute a restoring function is expected to exceed a predetermined second threshold, the restoring function is assigned to be a first restoring function. When the number of operations performed to execute a restoring function is expected to be below the predetermined second threshold, the restoring function is assigned to be a second restoring function. When the number of operations performed to execute a restoring function is expected to be the same as the predetermined second threshold, the restoring function is assigned to be either of the first or second restoring function. Referring to FIG. 3, the number of operations performed by each of the entropy decoding, the zero decoding, the inverse rearrangement, the inverse quantization, and the inverse space transform is expected to be greater than number of operations required by the motion estimation. Accordingly, the entropy decoding, the zero decoding, the inverse rearrangement, the inverse quantization, and the inverse space transform may be first restoring functions.

The memory 430 provides storing space to at least one of the first restoring unit 410 and the second restoring unit 420. When the memory 430 is connected to the first restoring unit 410, the memory 430 stores data generated while operating the first restoring unit 410, data used while operating the first restoring unit 410, etc. Similarly, when the memory 430 is connected to the second restoring unit 420, the memory stores data generated while operating the second restoring unit 420, data used while operating the second restoring unit 420, etc.

Figure 5:
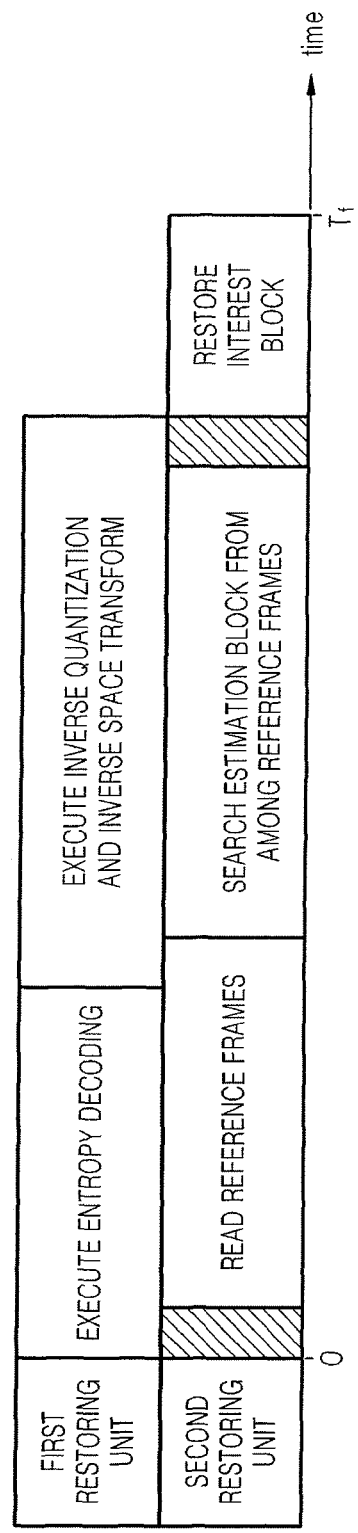
FIG. 5 is a timing diagram describing a principle of image restoration according to an embodiment of the present general inventive concept.

FIG. 5 is a timing diagram describing a principle of image restoration according to an embodiment of the present general inventive concept.

According to certain embodiments of the present general inventive concept, at least one first restoring function and at least one second restoring function can be executed concurrently. That is, the apparatus and method of restoring an image according to embodiments of the present general inventive concept can process a plurality of restoring functions in parallel.

For purposes of description and not limitation, the first restoring unit 410 will be considered as all of the functional units in the component chain illustrated in FIG. 3 from the entropy decoding unit 312 through the inverse space transforming unit 320. The second restoring unit 420 will be considered as the motion estimating unit 322 illustrated in FIG. 3, and the decoder 120A illustrated in FIG. 3 will be considered as operating in the inter mode. Accordingly, FIG. 5 will be described referring to FIGS. 3 and 4A-4B.

The first restoring unit 410 entropy decodes a bitstream input through the input port IN4 (time of entropy decoding=0). Accordingly, from the bitstream, the first restoring unit 410 extracts a motion vector (MV) generated in the motion compensating unit 216 and extracts a result of RL encoding previously performed in the zero encoding unit 228. In this case, the first restoring unit 410 may extract the MV previously generated in the motion compensating unit 216 before the result of RL encoding in the zero encoding unit 228.

The second restoring unit 420 reads the reference frames in the memory 430. Here, as illustrated in FIG. 5, a time period where the entropy decoding is executed by the first restoring unit 410 and a time period where the reference frames are read by the second restoring unit 420 overlap. In other words, the entropy decoding, which is a first restoring function, and the motion estimation (specifically, a reference frame read), which is a second restoring function, can be executed in parallel.

After the entropy decoding has been executed, the first restoring unit 410 executes the inverse quantization and the inverse space transform. Also, the second restoring unit 420 searches an estimation block from among the read reference frames using the extracted motion vector.

Here, as illustrated in FIG. 5, a time period where the inverse quantization and the inverse space transform are executed by the first restoring unit 410 and the time period where the reference frames are read by the second restoring unit 420 overlap. That is, the inverse quantization and the inverse space transform, which are first restoring functions, and the motion estimation (specifically, reference frames that are read), which is a second restoring function, are executed in parallel.

Also, as illustrated in FIG. 5, the time period where the inverse quantization and the inverse space transform are executed by the first restoring unit 410 and the time period where the estimation block is searched by the second restoring unit 420 overlap. That is, the inverse quantization and the inverse space transform, which are first restoring functions, and the motion estimation (specifically, an estimation block search), which is a second restoring function, are executed in parallel.

The second restoring unit 420 restores an interest block using the result of the inverse space transform in the first restoring unit 410 and the estimation block searched in the second restoring unit 420 (time of restoration completion=$T_f$).

The present general inventive concept can also be embodied as computer readable codes on a computer readable recording medium. The computer readable medium is any data storage device that can store data which can be thereafter read by a computer system. Examples of the computer readable medium include read-only memory (ROM), random-access memory (RAM), CD-ROMs, magnetic tapes, floppy disks, optical data storage devices, and carrier waves (such as data transmission through the Internet). The computer readable medium can also be distributed over network coupled computer systems so that the computer readable code is stored and executed in a distributed fashion.

As described above, the apparatus and method of restoring an image according to the present general inventive concept can quickly restore a block by presetting each of a plurality of restoring functions, which will be executed while restoring the block, where the restoring functions will be executed relatively quickly using software or hardware, and executing each of the restoring functions as preset. In detail, the restoring functions that have a relatively high memory access frequency may be executed using hardware and the restoring functions that have a relatively high number of operations performed is executed using software. Accordingly, a high resolution image can be restored and reproduced in real-time. Such an effect is more advantageous when the first restoring function and the second restoring function are executed in parallel.

Moreover, a chip including a moving image reproduction function employing the apparatus to restore an image according to the present general inventive concept can be embodied in a system on chip (SoC), which has minimum power consumption. Also, according to the apparatus and method of restoring an image of the present general inventive concept, the entropy decoding can be executed using software, which enables the entropy decoding to be programmable. Accordingly, the type of entropy decoding can be easily changed considering the type of entropy encoding that was used to generate a bitstream.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An apparatus to restore an encoded image, the apparatus comprising:
    a decoder configured to perform a restoring process on the encoded image, the decoder including,
    a memory configured to store a plurality of processor instructions,
    a processor configured to execute an intra-mode restoring function on the encoded image using the plurality of processor instructions, and
    a hard-wired circuit configured to execute an inter-mode restoring function on the encoded image, and
    the decoder configured to perform operations comprising,
    determining a memory access frequency of the restoring process and a number of operations of the restoring process,
    identifying the restoring process from among the intra-mode restoring function and the inter-mode restoring function based on the memory access frequency of the restoring process and the number of operations of the restoring process,
    switching to the intra-mode restoring function when the memory access frequency is below a first threshold and the number of operations exceeds a second threshold, or to the inter-mode restoring function otherwise, and
    performing the intra-mode restoring function or the inter-mode restoring function selected by the switching, the intra-mode restoring function being performed by executing the plurality of processor instructions, the inter-mode restoring function being performed using a hard-wired circuit.

2. The apparatus of claim 1, wherein the decoder is configured to execute a plurality of restoring processes in parallel such that at least one intra-mode restoring function and at least one inter-mode restoring function are executed concurrently.

3. The apparatus of claim 1, wherein the number of operations of the inter-mode restoring function is less than the number of operations of the intra-mode restoring function.

4. A method of restoring an encoded image, the method comprising:
    determining a memory access frequency of a restoring process for restoring the encoded image and a number of operations of the restoring process;
    identifying the restoring process from among an intra-mode restoring function and an inter-mode restoring function based on the memory access frequency of the restoring process and the number of operations of the restoring process;
    switching to the intra-mode restoring function when the memory access frequency is below a first threshold and the number of operations exceeds a second threshold, or to the inter-mode restoring function otherwise; and performing the intra-mode restoring function or the inter-mode restoring function selected by the switching, the intra-mode restoring function being performed by executing a plurality of processor instructions, the inter-mode restoring function being performed using a hard-wired circuit.

5. The method of claim 4, wherein the method performs a plurality of restoring functions in parallel such that at least one intra-mode restoring function and at least one inter-mode restoring function are executed concurrently.

6. The method of claim 4, wherein the number of operations of the inter-mode restoring function is less than the number of operations of the intra-mode restoring function.

* * * * *